Patented Dec. 14, 1943

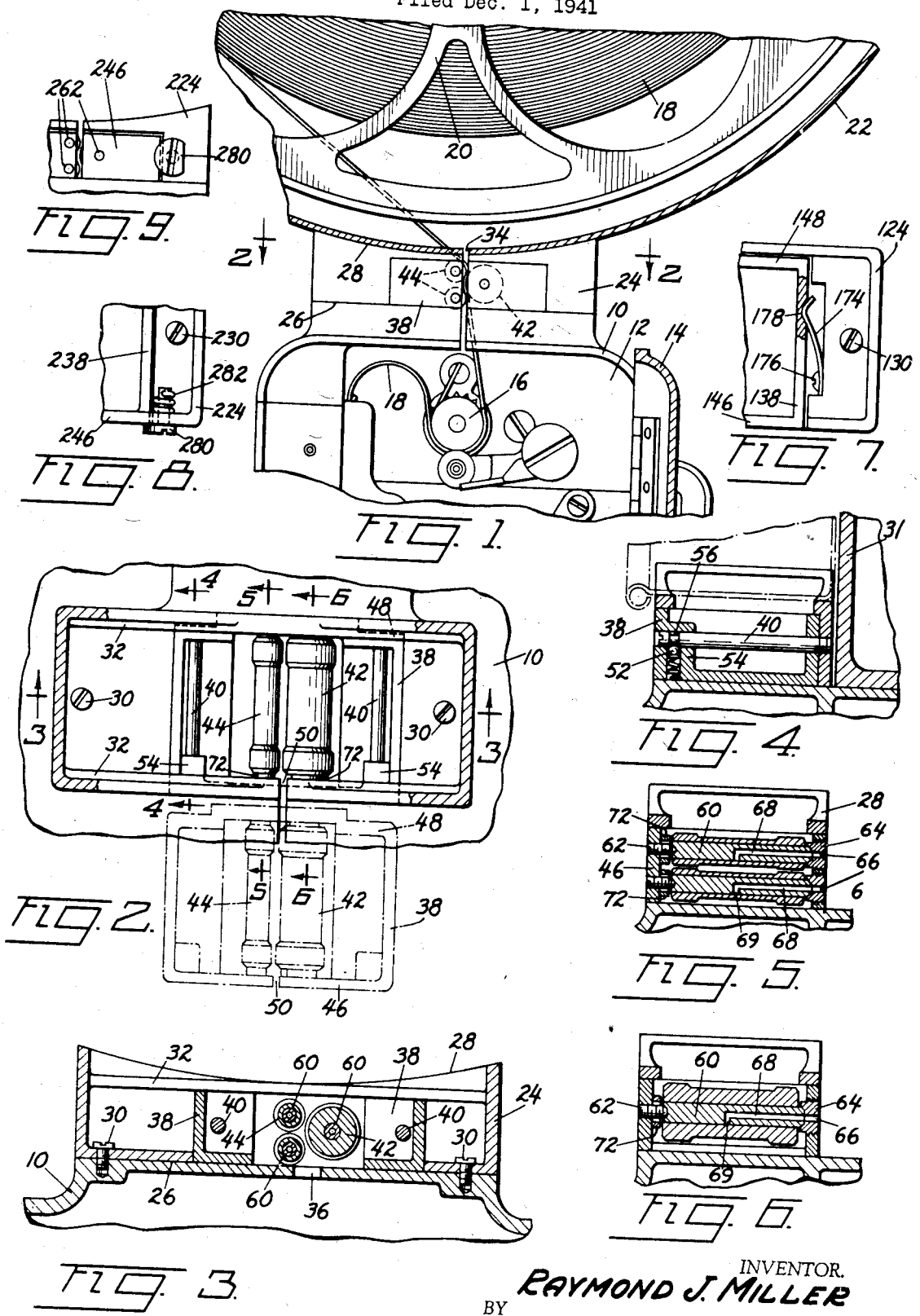

2,336,746

UNITED STATES PATENT OFFICE 2,336,746

MOTION PICTURE PROJECTOR

Raymond J. Miller, Detroit, Mich., assignor to American Pattern and Manufacturing Co., Detroit, Mich., a co-partnership consisting of said Miller and Alfred E. Wilson, Detroit, Mich.

Application December 1, 1941, Serial No. 421,114

3 Claims. (Cl. 88—17)

This invention relates to motion picture projectors and more particularly to an improved fire valve and clean-out drawer adapted to be removably interposed between the film magazines and the film compartment of a motion picture projector.

In modern motion picture projectors, independent visual images carried by suitable strip material are successively aligned with an aperture formed in a member and are projected onto a screen by a light directed through the aperture and film to create the illusion of motion.

The film may be formed of Celluloid or any other relatively transparent material having the desired qualities of flexibility, uniformity of texture and durability.

The materials heretofore found suitable for motion picture projector film are highly inflammable. The light employed to project the images from the film onto the screen may emanate from any suitable light source, and the light rays are concentrated on the film aligned with the aperture. When the spaced film frames are aligned with the aperture to project the visual images onto the screen, the highly inflammable film is subjected to the full heat intensity of the concentrated rays of the projecting light. A considerable fire hazard is thus involved.

The strip film material is stored and transported in roll form, being wound on suitable reels. In the operation of the projector, the film is withdrawn from one reel preferably positioned in an upper film magazine, and is successively directed through a film compartment of the projector and a sound head to a second reel positioned in a lower film magazine.

As the film is withdrawn from the upper film magazine and is directed through the film compartment of the projector, small particles of film and film shavings are released from the film and become deposited throughout the film compartment. This is particularly true of old film or film which has been used repeatedly. In view of the highly inflammable nature of the film material, the depositing of film particles and dust throughout the film compartment of the projector and the sound head constitutes a serious fire hazard, particularly in view of the fact that the air within the film compartment is normally heated by the projecting light to a relatively high degree.

An object of this invention is to provide a removable clean-out drawer and fire valve interposed between the film magazines and the film compartment of the projector to collect film particles, dust and shavings released from the film to prevent them from entering the film compartment of the projector.

Another object is to provide a removable clean-out drawer haivng support members for spaced fire valve rollers whereby strip film material can be readily threaded through an outwardly directed slot into the space between the rollers.

A further object of the invention resides in the provision of a readily removable clean-out drawer positioned between a film magazine and the film compartment of a motion picture projector whereby accumulated film particles and film dust may be readily and frequently removed.

Still another object is to provide a removable framework having a slotted wall supporting adjacently disposed fire valve rollers in such a manner that strip film material may be introduced through the slotted wall into the space between the fire valve rollers while the removable framework is in place between a film magazine and the film compartment of a motion picture projector.

A further object of the invention resides in the provision of an improved film magazine adapter for a motion picture projector having a removable cleanout drawer supportedly mounted therein.

Another object is to provide a split fire valve and clean-out drawer movably supported on suitable guides in a magazine adapter whereby the drawer may be readily removed to clean-out accumulated film chips and dust without disturbing the other parts of the projector.

Yet a still further object resides in the provision of a novel and improved removable clean-out drawer having fire valve rollers mounted in an improved manner whereby the rollers are supported at one end by spaced members to provide a space between the rollers for the reception of film, and the rollers are internally lubricated in such a manner that excess lubricant is thrown off the rollers beyond the edge of the film.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a fragmentary side elevation of a motion picture projector embodying the present invention.

Fig. 2 is a sectional view taken substantially on the line 2—2 of Fig. 1, looking in the direction of the arrows and showing in full lines the clean-out drawer in the operative position, and in dot-dash lines showing the clean-out drawer in the removed or cleaning position.

Fig. 3 is a sectional view taken substantially on the line 3—3 of Fig. 2, looking in the direction of the arrows.

Figs. 4, 5 and 6 are sectional views taken substantially on the lines 4—4, 5—5 and 6—6 of Fig. 2 respectively, each looking in the direction of the arrows.

Fig. 7 is a fragmentary view similar to Fig. 2, showing a modified form of the invention.

Fig. 8 is a fragmentary view similar to Fig. 7, showing a still further modified form of the invention.

Fig. 9 is a front elevation of the modified embodiment illustrated in Fig. 8.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now more particularly to Fig. 1, it will be observed that the invention is illustrated as applied to a motion picture projector having a main casing 10 housing a film compartment 12 closed by a door 14. The film compartment 12 houses a film driving sprocket 16 cooperating with other film guiding and driving means not shown to withdraw strip film material 18 from a reel 20 to intermittently align spaced frames of the film material with an aperture for projection onto a screen positioned at a distance from the projector.

The reel 20 may be rotatably supported in a film magazine 22 positioned above the casing 10 of the projector. A magazine adapter 24 having a substantially flat bottom surface 26 and an arcuate shaped upper surface 28 contoured to receive the film magazine 20 may be interposed between the magazine 22 and the projector casing 10. The film 18 passes through the film compartment 12 and a sound head preferably positioned beneath the film compartment and is wound on another reel similar to the reel 20 positioned in a film magazine preferably positioned beneath the sound head of the projection device. Another fire tray may be interposed between the sound head and the lower film magazine.

As more clearly illustrated in Figs. 2 and 3, the magazine adapter 24 may be detachably connected to the top of the casing 10 by suitable screws 30. A vertically extended reinforced bracket 31 supports the film magazine 22 in operative position on the casing 10 of the projector.

The magazine adapter 24 is preferably formed with laterally extending front and rear rigidifying flanges 32. As illustrated in Fig. 1, the magazine adapter 22 has its lower front portion cut away as illustrated at 34 to form a slot for the reception of the strip film material 18 for threading the projector. The slot 34 is aligned vertically with a slot 36 formed in the top of the projector casing 10 as illustrated in Fig. 3.

A clean-out drawer or tray 38 is removably mounted in the magazine adapter 24. Guiding means may be interposed between the drawer 39 and the magazine adapter 24. One suitable form of guiding means comprises spaced rods 40 carried by the magazine adapter 24 to project through the clean-out drawer 38 and guide it in its movement into and out of the magazine adapter 24.

The clean-out drawer 38 is provided with a plurality of spaced film guiding rollers, such for example as a large roller 42 and a plurality of vertically spaced smaller rollers 44. The rollers 42 and 44 are suitably journalled in front and back walls 46 and 48 respectively of the clean-out drawer 38. The rollers are so spaced that their peripheries extend beyond each other so that the film in passing through them must take a zig-zag course, thus more effectively closing off the slot in case of fire, and assuring constant rotation of the rollers. The front wall 46 of the drawer is formed with a slot 50 aligned with the slots 34 and 36 in the film magazine 22 and casing 10 of the projector respectively.

Locking means such for example as spring pressed balls 52 positioned in bosses 54 formed in the drawer 38 may be provided to engage within grooves 56 formed in the guide rods 40. The balls 52 project into the groves 56 to maintain the drawer 38 in the closed position until it is subjected to a force axially of the rods 40 of sufficient magnitude to yieldingly urge the balls out of the grooves against the resistance of their associated springs whereupon the drawer 38 may be withdrawn from the magazine adapter 24.

As illustrated in Figs. 3, 5 and 6, each of the rollers 42 and 44 revolves on a separate shaft 60. As more clearly illustrated in Figs. 5 and 6, each of the shafts 60 may be held in place in the clean-out drawer 38 by a male screw threaded member 62 at one end, and by a female screw threaded member 64 at the other end. The shafts 60 are preferably prevented from rotating with their associated rollers 42 and 44 by the connections 62 and 64. Suitable spacers 72 are provided to position the rollers axially relative to the threaded members 62 and 64.

The members 64 are formed with oil ducts 66 communicating with axially extending oil ducts 68 formed in the shafts 60 for the rollers 42 and 44. The axially extending oil ducts 68 terminate in radially extended ducts 69 positioned approximately midway of the length of the shafts 60. Oil supplied periodically to lubricate the rollers 42 and 44 is introduced through the ducts 66 of the members 64 and travels through the axially extending ducts 68 to the radially extended ducts 69. The oil is then discharged to the space between the shafts 60 and the rollers 42 and 44 substantially midway between the ends of the rollers. Any excess lubricant which seeps out from the space between the roller and its associated shaft is thrown outwardly by centrifugal force beyond the edge of the film. Lubricant is thus prevented from being deposited on the film.

In the operation of this device film 18 withdrawn from the reel 20 passes between the rollers 42 and 44 and is then directed to the film driving sprocket 16 in the film compartment 12 of the projector. In passing between the relatively closely spaced rollers 42 and 44 which rotate freely under the frictional contact of the film 18 therewith, any film dust or chips of loose pieces of film are thrown off from the film and are deposited in the clean-out drawer 38. Film dust and chips are thus substantially prevented from entering the film compartment 12 of the projector.

After the projector has been operating for a substantially predetermined period of time, the drawer 38 may be removed from the film adapter 24 and cleaned without disturbing any other part of the projector or removing the film magazine 22.

To remove the clean-out drawer 38 the operator reaches within the magazine 22 after the reel 20 is removed and while the access door of the film magazine 22 is open and exerts a force against the inner side of the front wall 46 of the drawer 38. When a force is exerted on the drawer 38 axially of the guide rods 40 of sufficient magnitude to withdraw the locking balls 52 from the grooves 56 formed in the rods 40, the drawer 38 slides outwardly. The drawer 38 including its rollers 42 and 44 and the upper wall of the casing 10 adjacent the slot 36 may then be easily cleaned. After the cleaning operation has been performed the drawer 38 may be replaced in the magazine adapter 24 between the film compartment 12 and the film magazine 22.

The use of a readily removable clean-out drawer results in a more frequent cleaning of the space between the film magazine and the film compartment of the projector whereupon fire hazard is materially reduced because accumulated film dust and chips may be removed at frequent intervals before they collect in sufficient quantities to constitute a fire hazard.

At present in other projectors it is almost impossible to clean out the fire valve without removing the upper magazine from the projector and dismantling the rollers. Because of this the vital cleaning apparatus is neglected. It is important to prevent the frequent cause of fire, the chips of film from accumulating in the valve and afterwards being shaken down by vibration so that they fall in the path of the projection light where they become ignited very readily, setting fire to the rapidly moving film that is otherwise protected from the light by its motion.

If a fire results in the film compartment 12 of the projector, the fire valve rollers 42 and 44 tend to snuff out the fire of the film 18 at a sufficiently rapid rate to extinguish the fire before it reaches the film magazine 22.

The embodiment of the invention illustrated in Fig. 7 is similar in many respects to that illustrated in Figs. 1 to 6. Corresponding parts have therefore been given corresponding reference numerals with the addition of 100.

The removable fire tray 138 is supported on the top of the projector casing and, if desired, may be guided by springs 174 attached to the magazine adapter 124 as by screws 176. The springs 174 may be provided with bent end portions to engage within vertically extending slots 178 formed in the end walls of the clean-out drawer 138.

The embodiment of Figs. 8 and 9 is also similar in many respects to the embodiment of the invention of Figs. 1 to 6. Corresponding parts have been given corresponding reference numerals with the addition of 200.

The removable clean-out drawer 238 is yieldingly held in place in the magazine adapter 224 by means of plungers 280 being journalled in the magazine adapter 224. The heads of the plungers 280 are yieldingly urged towards the front wall of the adapter 224 by springs 282 interposed between the shank of the plunger and the inner surface of the front wall of the adapter 224.

The plungers 280 are each provided with a screw driver slot whereby they may be rotated, and have one side cut away to permit the removable fire tray to pass into or out of the adapter 224 when rotated to align the cut-away portion with the edge of the adapter adjacent the removable clean-out drawer 238. In the locked position as illustrated in Figs. 8 and 9, the plungers 280 yieldingly hold the removable fire tray in the operative or assembled position with the magazine adapter 224.

If desired, a magazine adapter having a removable clean-out drawer may be interposed between the sound head and the lower film magazine to prevent fires started in the film compartment 12 or sound head from passing to the lower film magazine.

It will of course be understood that if desired the removable clean-out drawer can be formed in two sections, each of which supports the rollers adapted to lie on one side of the film.

This is a continuation-in-part of my co-pending application Serial No. 250,310, filed January 11, 1939.

I claim:

1. In a motion picture projector a housing enclosing a film compartment, a film magazine positioned above the housing, a magazine adapter interposed between the housing and the film magazine and having a substantially vertical back wall and a front wall slotted vertically to permit threading of film into the projector, a removable clean-out drawer slidably mounted in the magazine adapter, the clean-out drawer having a back wall and a front wall slotted vertically in alignment with the slotted front wall of the magazine adapter to permit threading of film into the projector, spaced film-guiding rollers journaled in the front and back walls of the drawer on opposite sides of the slot in the front wall, guiding means between the magazine adapter and clean-out drawer comprising spaced rods carried by the back wall of the magazine adapter to project through the back wall of the drawer, spaced apertured bosses positioned in the front wall of the drawer to receive the spaced rods, cooperating ball and detent locking means between the rods and bosses, and yielding means associated with the bosses to actuate the locking means to maintain the drawer in assembled relation in the magazine adapter and to permit ready removal of the drawer for cleaning the rollers.

2. In a motion picture projector a housing having a film compartment, a film magazine positioned above the housing, a magazine adapter interposed between the housing and the film magazine and having a back wall and a front wall slotted vertically to permit threading of film into the projector, a removable clean-out drawer slidably mounted in the magazine adapter, the clean-out drawer having an uninterrupted back wall and a front wall slotted vertically in alignment with the slot in the front wall of the magazine adapter to permit threading of film into the projector, spaced nonrotatable shafts journaled in the front and back walls of the clean-out drawer on opposite sides of the slot in the front wall, fire valve rollers journaled on said shafts, oil ducts extending centrally of said shafts and communicating with the space between the shafts and rollers between the ends of the rollers, and yielding means between the magazine adapter and the clean-out drawer operable when the cleanout drawer approaches the fully closed position to maintain the drawer in assembled relation in the magazine adapter.

3. In a motion picture projector a housing enclosing a film compartment, a film magazine positioned above the housing, a magazine adapter interposed between the housing and the film magazine and having an uninterrupted substantially vertical back wall and a front wall slotted vertically to permit threading of film into the projector, a removable clean-out drawer slidably mounted in the magazine adapter, the clean-out drawer having an uninterrupted substantially vertical back wall adapted to be positioned in alignment with the uninterrupted substantially vertical back wall of the magazine adapter, the clean-out drawer having its front wall slotted vertically in alignment with the slotted front wall of the magazine adapter to permit threading of film into the projector, spaced rollers journaled in the front and back walls of the drawer on opposite sides of the slot in the front wall, and yielding means between the magazine adapter and the clean-out drawer operable when the clean-out drawer approaches the fully closed position to maintain the drawer in assembled relation in the magazine adapter and to permit ready removal of the drawer for cleaning the rollers upon application of a force directed towards the front wall thereof.

RAYMOND J. MILLER.